US008582747B2

(12) United States Patent
Shimazaki (10) Patent No.: US 8,582,747 B2
(45) Date of Patent: Nov. 12, 2013

(54) TELEPHONE DEVICE WITH MAIL FUNCTION, METHOD OF INITIATING MAIL, AND PROGRAM

(75) Inventor: Mamoru Shimazaki, Tokyo (JP)

(73) Assignee: NEC Corporation, Tokyo (JP)

( * ) Notice: Subject to any disclaimer, the term of this patent is extended or adjusted under 35 U.S.C. 154(b) by 845 days.

(21) Appl. No.: 12/669,986

(22) PCT Filed: Jul. 11, 2008

(86) PCT No.: PCT/JP2008/062973
§ 371 (c)(1),
(2), (4) Date: Jan. 21, 2010

(87) PCT Pub. No.: WO2009/014074
PCT Pub. Date: Jan. 29, 2009

(65) Prior Publication Data
US 2010/0189232 A1    Jul. 29, 2010

(30) Foreign Application Priority Data

Jul. 24, 2007   (JP) .................................. 2007-191977

(51) Int. Cl.
*H04M 3/42*   (2006.01)
(52) U.S. Cl.
USPC ............... 379/211.01; 379/93.01; 379/355.02
(58) Field of Classification Search
USPC .............................. 379/211.01, 93.01, 355.02
See application file for complete search history.

(56) References Cited

U.S. PATENT DOCUMENTS 6,320,943 B1 * 11/2001 Borland ................... 379/112.01
6,909,910 B2 * 6/2005 Pappalardo et al. .......... 455/558
7,280,652 B2 * 10/2007 Bocking et al. .......... 379/355.02
2004/0102225 A1 * 5/2004 Furuta et al. .................. 455/566
2006/0245552 A1   11/2006 Hayashi

FOREIGN PATENT DOCUMENTS

| CN | 1839616 A | 9/2006 |
| JP | 2-264544 A | 10/1990 |
| JP | 2000101703 A | 4/2000 |
| JP | 2003333134 A | 11/2003 |
| JP | 2004363925 A | 12/2004 |
| JP | 2006270757 A | 10/2006 |
| JP | 3913605 B2 | 5/2007 |

OTHER PUBLICATIONS

Extended European Search Report (EESR) in counterpart EP patent application 08778265.2, dated May 18, 2012.
International Search Report for PCT/JP2008/062973 mailed Aug. 19, 2008.
Chinese Office Action of CN200880100304.8 dated on Dec. 5, 2012.
Chinese Office Action for CN Application No. 200880100304.8 issued on Jun. 24, 2013 with English Translation.

* cited by examiner

*Primary Examiner* — Simon Sing
*Assistant Examiner* — Simon King (57) ABSTRACT

A telephone device has a storage unit 17 in which prescribed count information 173 is pre-registered, telephone call initiating/receiving means 181 for initiating a call to a telephone number of a receiving party, determining whether the receiving party responds to the call, and registering outgoing call history information 172 in the storage unit 17 each time a call is initiated, and function switching means 182 for acquiring the number of continuous non-responses of the same receiving party with reference to the outgoing call history information 172 when the receiving party does not respond and initiating a mail function when the acquired number of the non-responses is no less than the prescribed count.

10 Claims, 10 Drawing Sheets

(EXAMPLE OF DATA STORED AS OUTGOING
CALL HISTORY INFORMATION 172)

| No | NAME | CALLING TIME | NUMBER CALLED | CONNECTION STATUS | ... |
|---|---|---|---|---|---|
| 1 | AA | 2007/6/5 12:34 | 090-zzzz-zzzz | NOT RESPONDED | ... |
| 2 | CC | 2007/6/5 12:33 | 03-xxxx-xxxx | NOT RESPONDED | ... |
| 3 | AA | 2007/6/5 12:32 | 090-zzzz-zzzz | NOT RESPONDED | ... |
| 4 | CC | 2007/6/5 12:31 | 03-xxxx-xxxx | NOT RESPONDED | ... |
| 5 | AA | 2007/6/5 12:30 | 090-zzzz-zzzz | NOT RESPONDED | ... |
| 6 | BB | 2007/6/4 20:00 | 090-yyyy-yyyy | RESPONDED | ... |
| ... | ... | ... | ... | ... | ... |

FIG. 3

(EXAMPLE OF DATA STORED AS
PRESCRIBED COUNT INFORMATION 173)

| PRESCRIBED COUNT |
|---|
| 3 TIMES |

(EXAMPLE OF DATA STORED AS USER-SPECIFIC PRESCRIBED COUNT/PRESCRIBED PERIOD INFORMATION 173B)

| NAME | TELEPHONE | MAIL ADDRESS | PRESCRIBED COUNT | PRESCRIBED PERIOD | ... |
|---|---|---|---|---|---|
| AA | 090-zzzz-zzzz | zzz@zzz.zzz | 3 TIMES | 10 MINUTES | ... |
| BB | 090-yyyy-yyyy | – | 5 TIMES | 20 MINUTES | ... |
| CC | 03-xxxx-xxxx | xxx@xxx.xxx | 10 TIMES | 30 MINUTES | ... |
| ... | ... | ... | ... | ... | ... |

TELEPHONE DEVICE WITH MAIL FUNCTION, METHOD OF INITIATING MAIL, AND PROGRAM

TECHNICAL FIELD

The present invention relates to a telephone device with a mail function, a method of initiating mail, and a program which can initiate and control a mail function when a receiving party does not respond to a telephone call.

BACKGROUND ART

For example, related technology of initiating and controlling a mail function of a telephone device is disclosed at paragraphs [0021] to [0023] and FIGS. 1 and 6 of Japanese laid-open patent publication No. 2004-363925 (hereinafter referred to as Patent Literature 1).

Patent Literature 1 discloses:

Determining whether a receiving party has responded to a telephone call within a predetermined period of time;

Determining whether the receiving party is one of specific parties (users registered in an address book) if the receiving party did not respond within the predetermined period of time; and Automatically initiating a mail function when the receiving party did not respond within the predetermined period of time and is one of the specific parties.

DISCLOSURE OF INVENTION

Problem(s) to be Solved by the Invention

According to Patent Literature 1, a mail function is initiated immediately if a specific receiving party does not respond to a telephone call. In other words, a mail massage is sent each time the receiving party does not respond to a telephone call. Generally, a receiving party does not respond for various reasons, other than a reason that she does not notice a telephone call, which include a reason that, while she notices a telephone call, she cannot respond because she is traveling by public transport and a reason that she does not want to respond immediately because she is listening to music or watching television or the like. A caller tends to redial when she is confronted with a situation in which a receiving party did not respond. Specifically, tendency to use a telephone rather than mail or the like reflects the caller's desire to have a telephone conversation of real-time communication. Furthermore, in view of the aforementioned reasons for which the receiving party did not respond, a caller expects that the receiving party will be able to respond with the lapse of time. A caller often abandons a telephone conversation or switches to sending mail when there was no response after she redialed several times. Thus, a system can reflect caller's intent and behavior if it is configured so as not to switch to mail immediately after a receiving party did not respond to one telephone call, but to watch whether the receiving party has responded to the caller's telephone calls, and to switch to mail only when non-responses continue several times. However, according to Patent Literature 1, the system switches to mail immediately after one non-response. Thus, no consideration has been given to a control reflecting the aforementioned caller's intent and behavior.

It is an object of the present invention to provide a telephone device with a mail function, a method of initiating mail, and a program that can solve the above problems.

Means to Solve the Problem(s)

A telephone device with a mail function according to the present invention has a storage unit in which a prescribed count is pre-registered, telephone call initiating/receiving means for initiating a call to a telephone number of a receiving party, determining whether the receiving party responds to the call, and registering outgoing call history information in the storage unit each time a call is initiated, and function switching means for acquiring the number of continuous non-responses of the same receiving party with reference to the outgoing call history information when the receiving party does not respond and initiating the mail function when the acquired number of the non-responses is no less than the prescribed count.

A program according to the present invention is for implementing, with a computer, a function of registering outgoing call history information each time a call is initiated, a function of initiating a call to a telephone number of a receiving party and determining whether the receiving party responds to the call, a function of acquiring the number of continuous non-responses of the same receiving party with reference to the outgoing call history information when the receiving party does not respond, and a function of initiating mail when the acquired number of the non-responses is no less than the prescribed count.

A mail initiation method according to the present invention includes registering outgoing call history information each time a call is initiated, acquiring the number of continuous non-responses of the same receiving party based on the outgoing call history information when the receiving party does not respond to a telephone call, and initiating mail when the acquired number of the non-responses is no less than the prescribed count.

Effect(s) of the Invention

According to the present invention, automatic switching to mail can be implemented based on a history of non-responses of a receiving party when the receiving party does not respond to a telephone call being made.

BEST MODE FOR CARRYING OUT THE INVENTION

Embodiments of the present invention will be described in detail with reference to the drawings.

Figure 1:
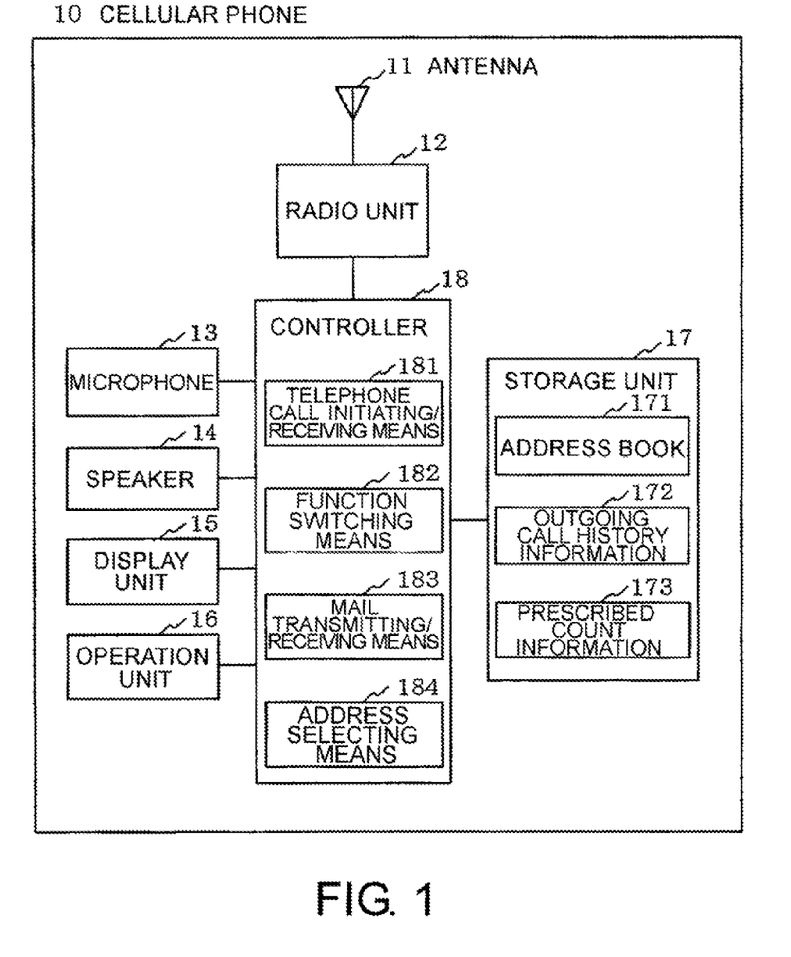
FIG. 1 is a diagram showing a configuration of a first embodiment of the present invention.

FIG. 1 is a diagram showing a configuration of a first embodiment of the present invention. A cellular phone 10 has an antenna 11, a radio unit 12, a microphone 13, a speaker 14, a display unit 15, an operation unit 16, a storage unit 17, and a controller 18. The radio unit 12 is a communication device operable to transmit and receive radio signals to and from a base station, which is not shown, via the antenna 11. The microphone 13 receives an input of a voice and the like. The speaker 14 outputs a voice, an alarming sound, and the like. The display unit 15 is a display device such as an LCD (Liquid Crystal Display). The operation unit 16 is an input device such as a ten-key, a function key, or a pointing device.

Figure 2:
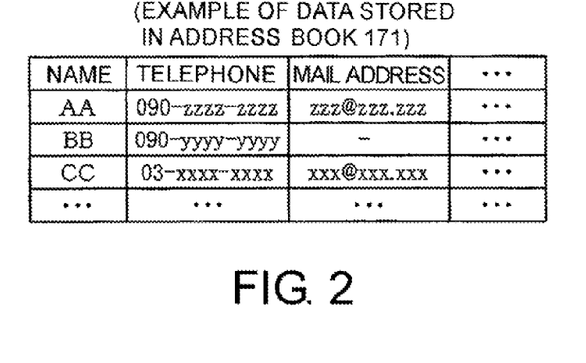
FIG. 2 is a table showing an example of data stored in an address book 171.
Figure 3:
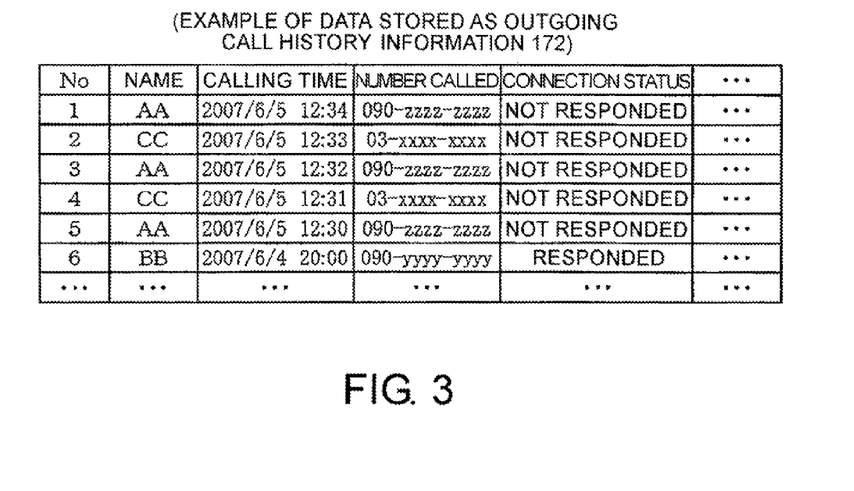
FIG. 3 is a table showing an example of data stored as outgoing call history information 172.
Figure 4:
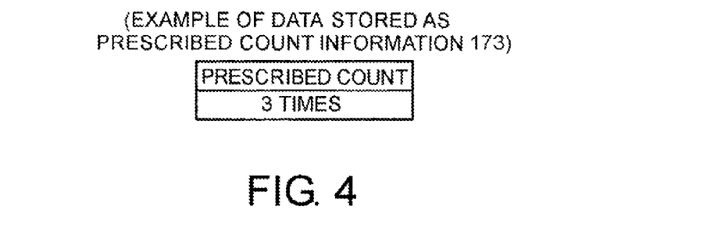
FIG. 4 is a table showing an example of data stored as prescribed count information 173.

The storage unit 17 is a readable and writable storage device. The storage unit 17 stores therein information including an address book 171, outgoing call history information 172, and prescribed count information 173. As shown in FIG. 2, which is a table showing an example of data stored in the address book 171, names, telephone numbers, mail addresses, and the like are associated with each other and pre-registered in the address book 171. As shown in FIG. 3, which is a table showing an example of data stored as the outgoing call history information 172, the outgoing call history information 172 includes names of parties called, calling times, telephone numbers of the parties called, connection statuses (responded or not responded), and the like. As shown in FIG. 4, which is a table showing an example of data stored as the prescribed count information 173, a prescribed count (e.g., three times) is pre-registered as the prescribed count information 173. The prescribed count defines the number of calls to automatically initiate a mail function when calls to the same receiving party continue to be irresponsive the prescribed number of times. The prescribed count is preset by a user of the cellular phone 10.

The controller 18 is a control device such as a CPU (Central Processing Unit) and has a telephone call initiating/receiving means 181, a function switching means 182, a mail transmitting/receiving means 183, and an address selecting means 184. The controller 18 is controlled in operation by a program, which is read and executed by the controller 18 to thereby implement operation of each means of the controller 18. The telephone call initiating/receiving means 181 has a function of controlling a telephone initiating/receiving process and a telephone conversation and a function of recording outgoing call history information in a storage area of the outgoing call history information 172 of the storage unit 17 for each outgoing call. The function switching means 182 has a function of acquiring the number of continuous non-responses of the same receiving party with reference to the outgoing call history information 172 when the receiving party does not respond and a function of initiating a mail function if the number of the non-responses is no less than the prescribed count. The mail transmitting/receiving means 183 has a function of creating a mail massage and controlling transmission and receipt of mail. The address selecting means 184 has a function of acquiring a mail address from the address book 171 based on the telephone number called at the time of initiation of mail by the function switching means 182 and a function of making an input request to the mail transmitting/receiving means 183 with the acquired mail address as destination address information.

Figure 5:
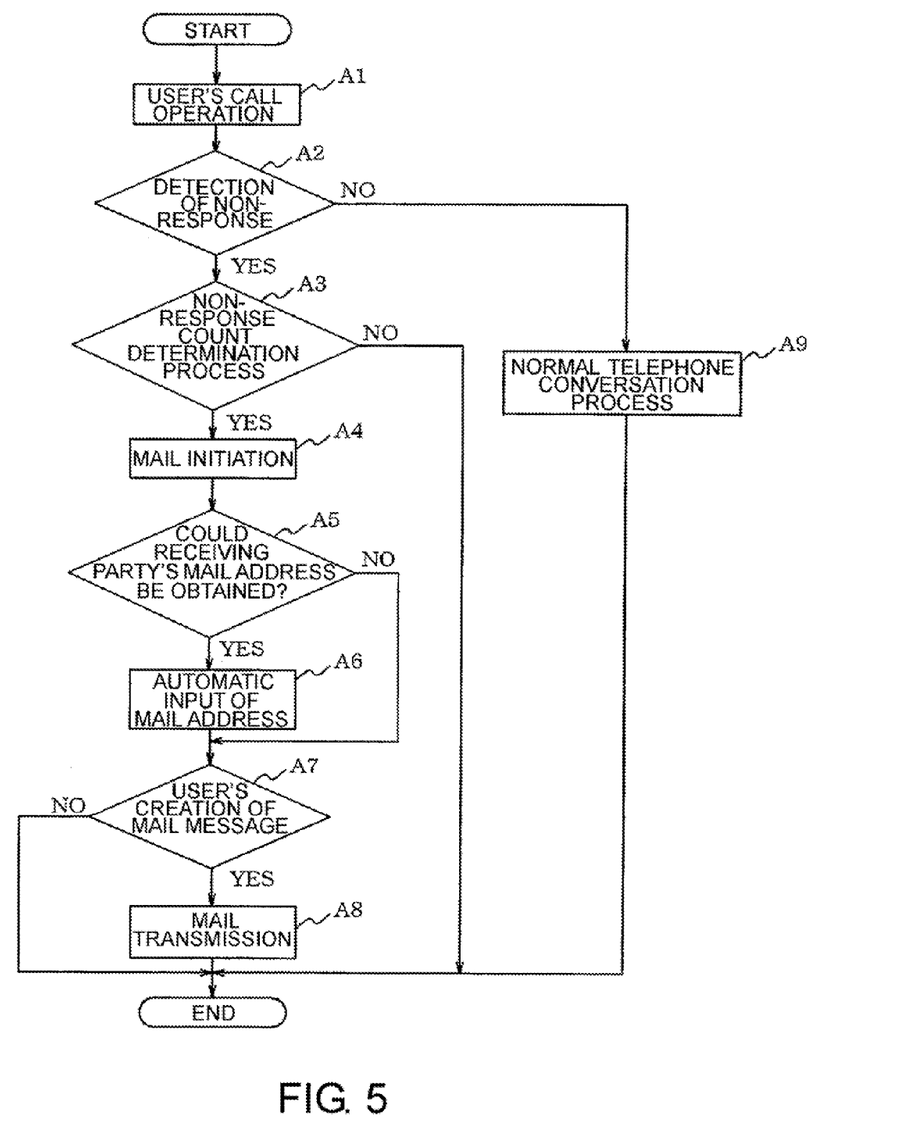
FIG. 5 is a flow chart showing operation of the first embodiment of the present invention.
Figure 6:
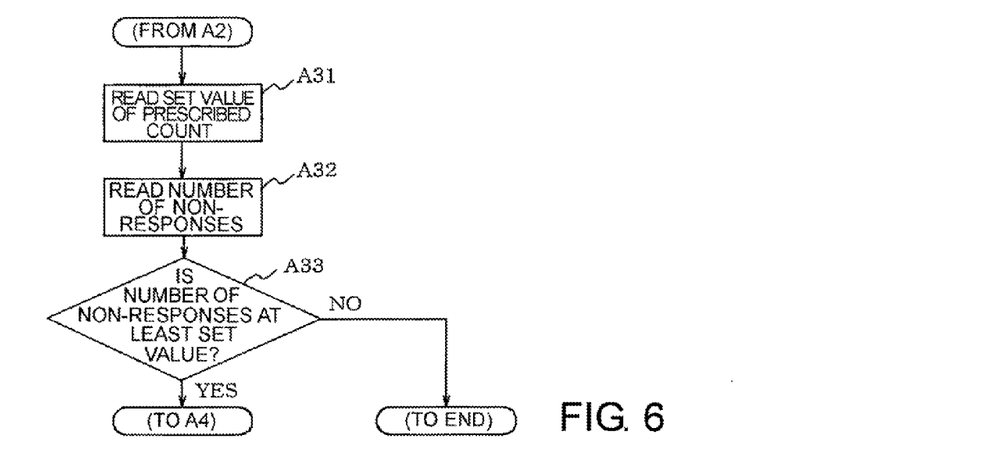
FIG. 6 is a flow chart showing operation of a non-response count examination process according to the first embodiment of the present invention.

Next, operation of a first embodiment of the present invention will be described with reference to FIGS. 1 to 6. FIG. 5 is a flow chart showing operation of the first embodiment of the present invention, and FIG. 6 is a flow chart showing operation of a non-response count examination process according to the first embodiment of the present invention.

Referring to FIG. 5, when a user selects a telephone number registered in the address book 171 or directly inputs a telephone number from the operation unit 16, the telephone call initiating/receiving means 181 of the controller 18 performs a call process. Specifically, the telephone call initiating/receiving means 181 establishes a connection with a base station, which is not shown, via the radio unit 12 and the antenna 11, notifies a telecommunication network of the telephone number of the receiving party via the base station, and calls the receiving party (Step A1). Then the telephone call initiating/receiving means 181 monitors a call response notification from the base station. When the receiving party has responded (there has been a call response notification), the telephone call initiating/receiving means 181 performs a normal telephone conversation process. The user makes a telephone conversation with the receiving party via the microphone 13 and the speaker 14 (Step A2→Step A9).

If the receiving party did not respond (there was no call response notification within a predetermined period of time), the telephone call initiating/receiving means 181 determines that the receiving party is irresponsive and proceeds to a non-response count determination process of Step A3. This process is performed by the function switching means 182. If conditions for the non-response count determination process are not met, the process is terminated. If the conditions of Step A3 are met, the process proceeds to Step A4. Here, details of operation in Step A3 will be described with reference to FIG. 6. First, the function switching means 182 acquires a prescribed count (e.g., three times) from the prescribed count information 173 (Step A31). Then the function switching means 182 acquires the number of non-responses recorded in association with the telephone number of the receiving party who did not respond to the current call with reference to the outgoing call history information 172. The number of non-responses to be acquired is the number of non-responses in association with the telephone number of the receiving party that have continued in the past until the latest non-response (the current non-response). Assuming that Mr. AA was called at this time and was irresponsive, it can be seen from FIG. 3 that the number of continuous non-responses in association with Mr. AA is three (Nos. 1, 3, and 5) (Step A32). The number of non-responses is three, and the prescribed count is three. Thus, the number of the non-responses is no less than the prescribed count. Therefore, the conditions of the non-response count determination process are met, and the process proceeds to Step A4 (Step A33).

Various types of information on all outgoing calls, irrespective of responsive calls or irresponsive calls, including names of receiving parties called, calling times, telephone numbers of the parties called, connection statuses (responded or not responded), and the like, are recorded in the outgoing call history information 172 for each outgoing call by the telephone call initiating/receiving means 181.

If it is determined in Step A33 that the number of the non-responses is no less than the prescribed count, then the function switching means 182 issues an initiation command to the mail transmitting/receiving means 183 to initiate a mail function. The mail transmitting/receiving means 183 displays a mail creation screen on the display unit 15 (Step A4). Next, the function switching means 182 passes the process to the address selecting means 184. The address selecting means 184 retrieves a mail address registered in association with the telephone number of the receiving party who did not respond from the address book 171 (see FIG. 2). If no mail address has been registered, the address selecting means 184 notifies the mail transmitting/receiving means 183 of a mail address acquisition failure and proceeds to Step A7 (Step A5 Step A7). If a mail address has been registered, the address selecting means 184 makes an input request to the mail transmitting/receiving means 183 with the acquired mail address as destination address information. The mail transmitting/receiving means 183 inputs the mail address on the mail function initiated and proceeds to Step A7 (Step A5→Step A6→Step A7).

In Step A7, the user inputs contents or the like on the mail creation screen displayed on the display unit 15 with the operation unit 16 and creates a mail message. If the mail transmitting/receiving means 183 is notified of the mail address acquisition failure in Step A5 by the address selecting means 184, then the mail transmitting/receiving means 183 displays a message requesting the user to input a mail address on the mail creation screen. Thus, the user inputs a mail address as requested in addition to contents (Step A7). Next, the user sends the mail message created in Step A7, and the process is terminated (Step A8). If the user cancels the mail creation in Step A7, the process is also terminated.

As described above, a mail function is automatically initiated when the number of non-responses of a receiving party to a telephone call reaches a prescribed count. This configuration is advantageous in that control reflecting the caller's intent and behavior can be achieved such that the caller redials several times in a case of non-responses and switches to mail when the receiving party has not responded yet. Furthermore, it is also advantageous in that a message can efficiently be sent to the receiving party who does not respond by mail with less user's operation.

Furthermore, it is also advantageous in that, even if a mail address of the receiving party cannot automatically be inputted as the address book 171 does not include the mail address of the receiving party when the mail function is automatically initiated, the user can directly input the mail address and send a mail message.

Moreover, it is also advantageous in that the system can be configured to conform to user's preference or intent because the user can preset the prescribed count.

Next, a second embodiment of the present invention will be described.

In the aforementioned first embodiment, a mail function is automatically initiated when the number of non-responses of a receiving party reaches a prescribed count. The present embodiment differs from the first embodiment in that a mail function is automatically initiated when the number of non-responses of a receiving party reaches a prescribed count and those non-responses occurred within a prescribed period of time.

Figure 7:
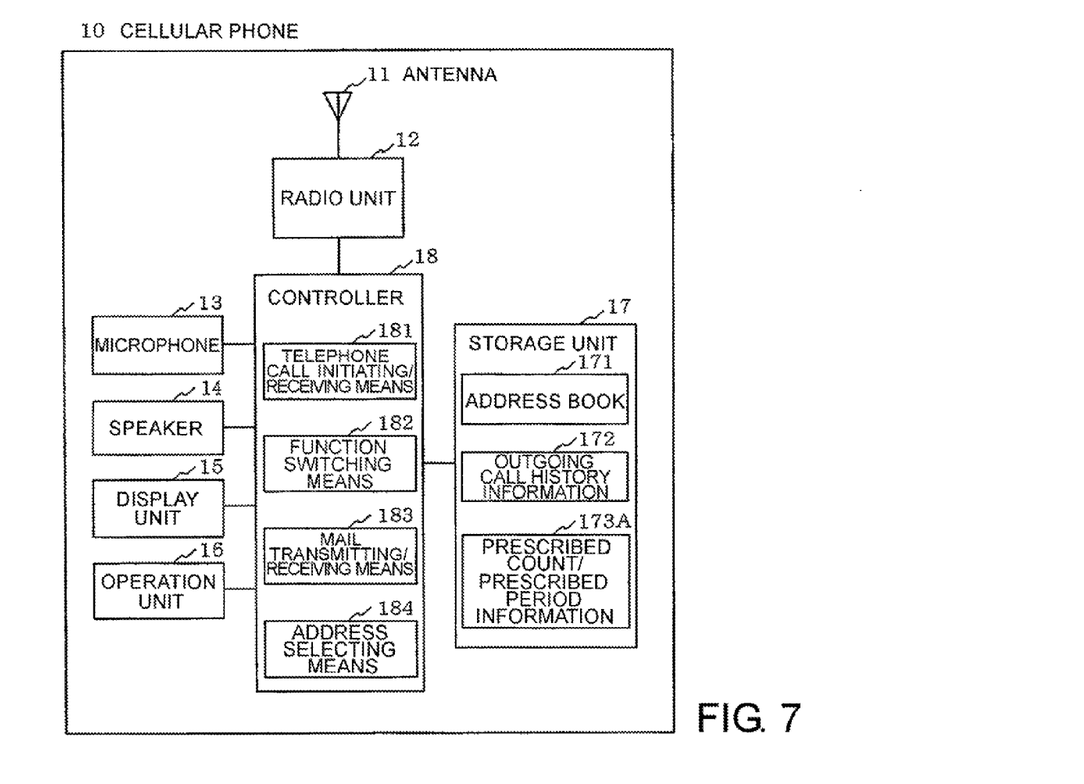
FIG. 7 is a diagram showing a configuration of a second embodiment of the present invention.
Figure 8:
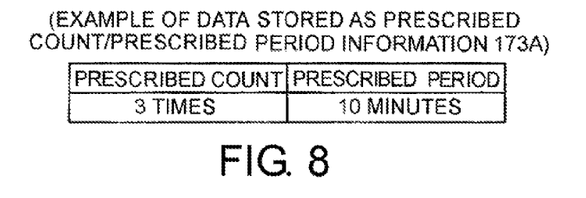
FIG. 8 is a table showing an example of data stored as prescribed count/prescribed period information 173A.

FIG. 7 is a diagram showing a configuration of the second embodiment of the present invention. FIG. 7 differs from FIG. 1 (the configuration of the first embodiment) in that the prescribed count information 173 is replaced with prescribed count/prescribed period information 173A. As shown in FIG. 8, which is a table showing an example of data stored as the prescribed count/prescribed period information 173A, a prescribed count (e.g., three times) and a prescribed period of time (e.g., 10 minutes) are pre-registered as the prescribed count/prescribed period information 173A. The prescribed period of time defines a period of time to automatically initiate a mail function when the prescribed number of non-responses occurred within the prescribed period of time. The prescribed count is preset by a user of the cellular phone 10.

Figure 9:
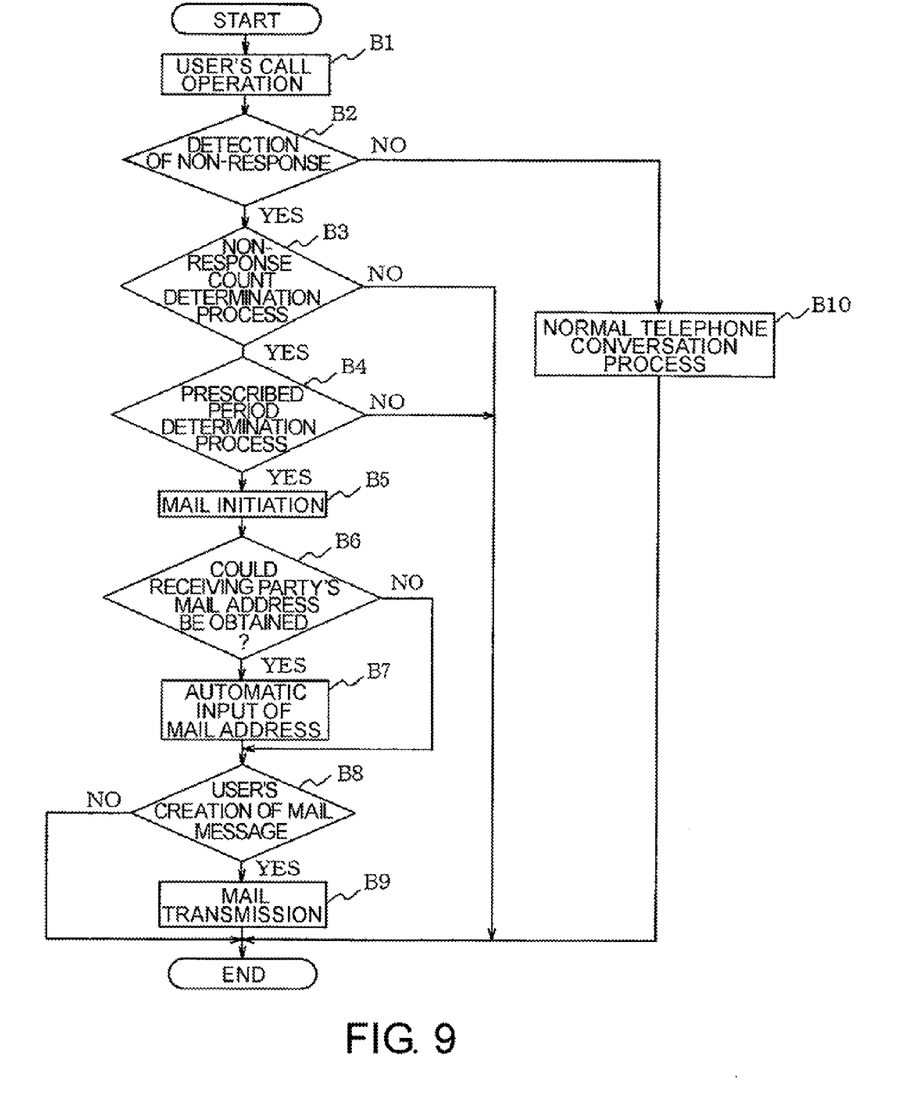
FIG. 9 is a flow chart showing operation of the second embodiment of the present invention.
Figure 10:
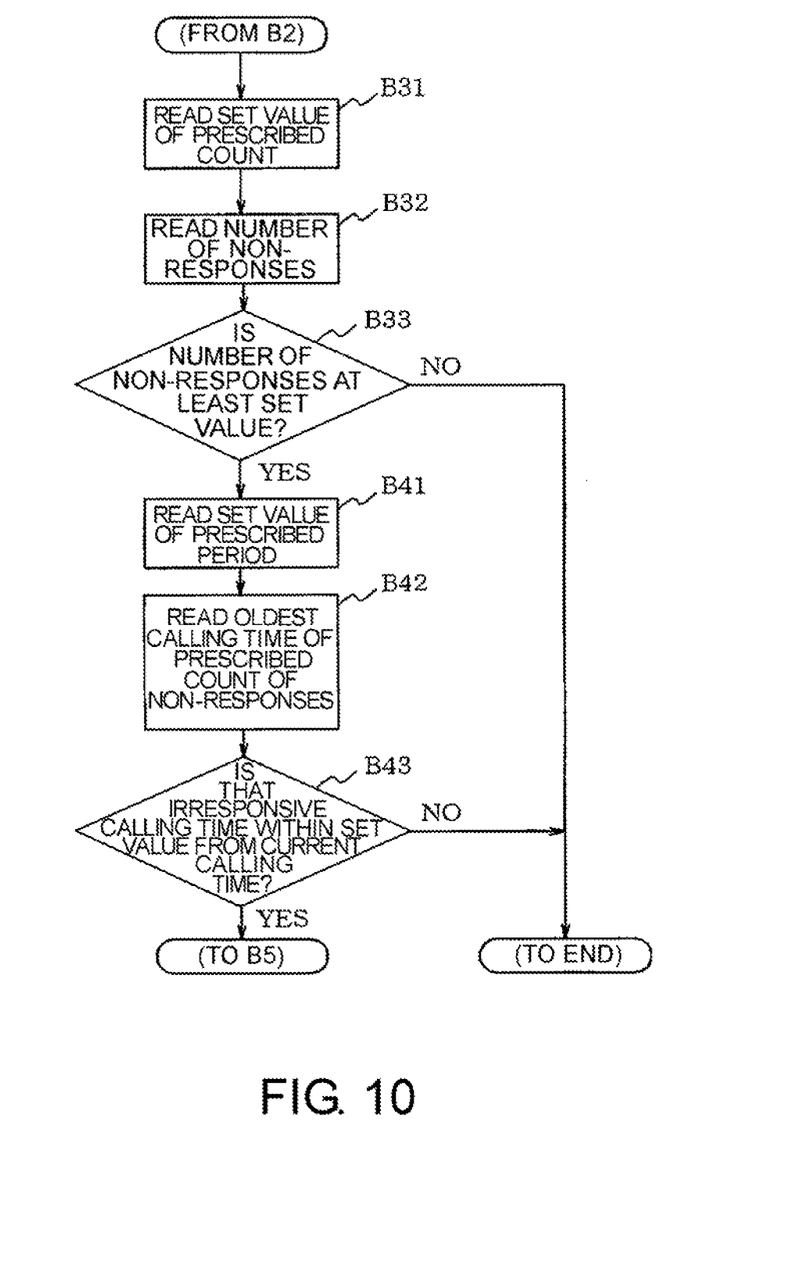
FIG. 10 is a flow chart showing operation of a non-response count/non-response period examination process according to the second embodiment of the present invention.

Next, operation of the present embodiment will be described with reference to FIGS. 7 to 10 and 3. FIG. 9 is a flow chart showing operation of the second embodiment of the present invention, and FIG. 10 is a flow chart showing operation of a non-response count/non-response period examination process according to the second embodiment of the present invention.

Referring to FIG. 9, because the following steps are the same, their explanations are omitted herein.
  Steps B1-B2 and Steps A1-A2 of FIG. 5 (operation of the first embodiment)
  Steps B5-B10 and Steps A4-A9 of FIG. 5

Thus, Steps B3-B4 will be described. Since operation of Steps B3 and B4 is illustrated in detail in FIG. 10, it will be described below with reference to FIG. 10.

First, the function switching means 182 acquires a prescribed count (e.g., three times) from the prescribed count/prescribed period information 173A (Step B31). Then the function switching means 182 acquires the number of non-responses recorded in association with the telephone number of the receiving party who did not respond to the current call with reference to the outgoing call history information 172. The number of non-responses to be acquired is the number of the non-responses in association with the telephone number of the receiving party that have continued in the past until the latest non-response (the current non-response). Assuming that Mr. AA was called at this time and was irresponsive, it can be seen from FIG. 3 that the number of continuous non-responses in association with Mr. AA is three (Nos. 1, 3, and 5) (Step B32). The number of non-responses is three, and the prescribed count is three. Thus, the number of non-responses is no less than the prescribed count. Therefore, the conditions of the non-response count determination process are met, and the process proceeds to Step B41 (Step B33).

In Step B41, the function switching means 182 acquires a prescribed period of time (e.g., 10 minutes) from the prescribed count/prescribed period information 173A (Step B41). Then the function switching means 182 reads the oldest calling time of the prescribed count (three) of the non-responses with reference to the outgoing call history information 172. Referring to FIG. 3, the oldest calling time of the prescribed count of Mr. AA's non-responses was No. 5 (at 12:30 on Jun. 5, 2007) (Step B42). Thereafter, the function switching means 182 examines whether the calling time of No. 5 (at 12:30 on Jun. 5, 2007) is within the prescribed period of time (10 minutes) from the calling time of the current call (No. 1) (at 12:34 on Jun. 5, 2007). If the oldest calling time is within the prescribed period of time, then the process proceeds to Step B5 so that a mail function is initiated. In the above example, a difference between the calling times of No. 5 and No. 1 is four minutes. Therefore, it is determined that the oldest calling time is within the prescribed period of time (Step B43).

As described above, in the present embodiment, a mail function is automatically initiated when the number of non-responses of a receiving party reaches a prescribed count and those non-responses occurred within a prescribed period of time. Thus, the prescribed period of time is added to conditions for mail initiation as compared to the first embodiment. Therefore, this configuration is advantageous in that conditions for mail initiation can be specified in more detail.

Next, a third embodiment of the present invention will be described.

In the aforementioned second embodiment, a mail function is automatically initiated when the number of non-responses of a receiving party reaches a prescribed count and those non-responses occurred within a prescribed period of time. In the second embodiment, the prescribed count and the prescribed period of time have the same values irrespective of receiving parties to be called. The present embodiment differs from the second embodiment in that a prescribed count and a prescribed period of time are set for each individual user in the address book 171.

Figure 11:
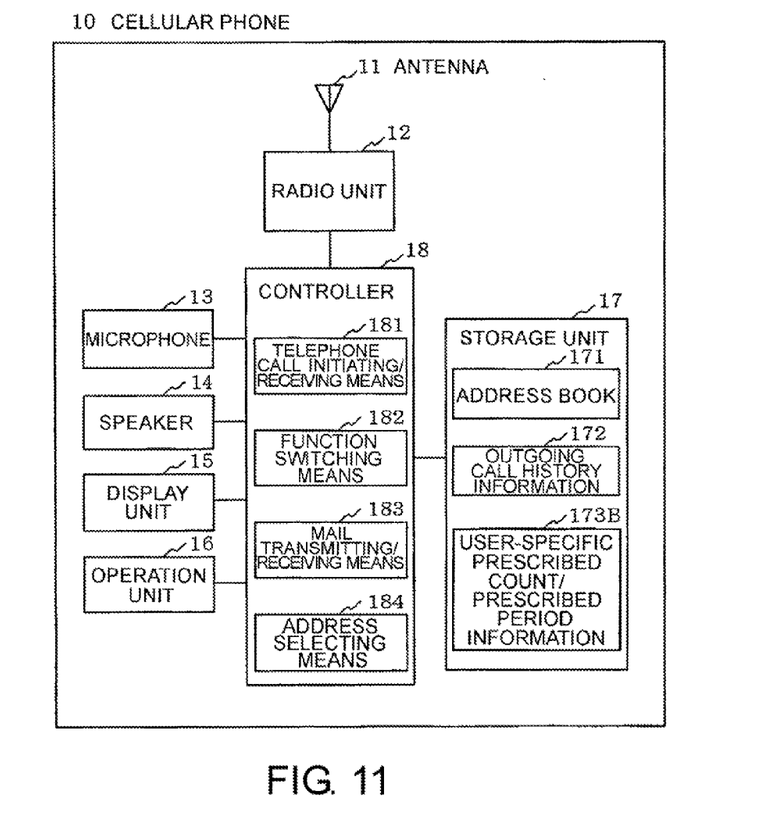
FIG. 11 is a diagram showing a configuration of a third embodiment of the present invention.
Figure 12:
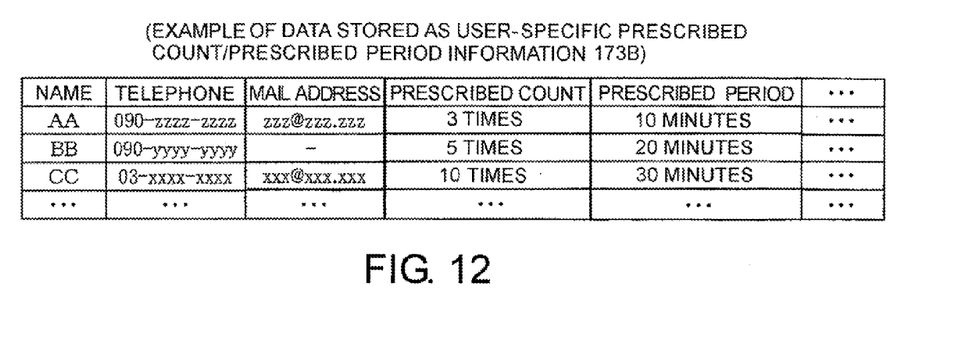
FIG. 12 is a table showing an example of data stored as user-specific prescribed count/prescribed period information 173B.

FIG. 11 is a diagram showing a configuration of the third embodiment of the present invention. FIG. 11 differs from FIG. 7 (the configuration of the second embodiment) in that the prescribed count/prescribed period information 173A is replaced with user-specific prescribed count/prescribed period information 173B. As shown in FIG. 12, which is a table showing an example of data stored as the user-specific prescribed count/prescribed period information 173B, a prescribed count and a prescribed period of time are pre-registered as the user-specific prescribed count/prescribed period information 173B for each user (each receiving party to be called). The user information (such as names, telephone numbers, and mail addresses) may be the same as the user information of the address book 171 or may be registered separately from the user information of the address book 171.

Figure 13:
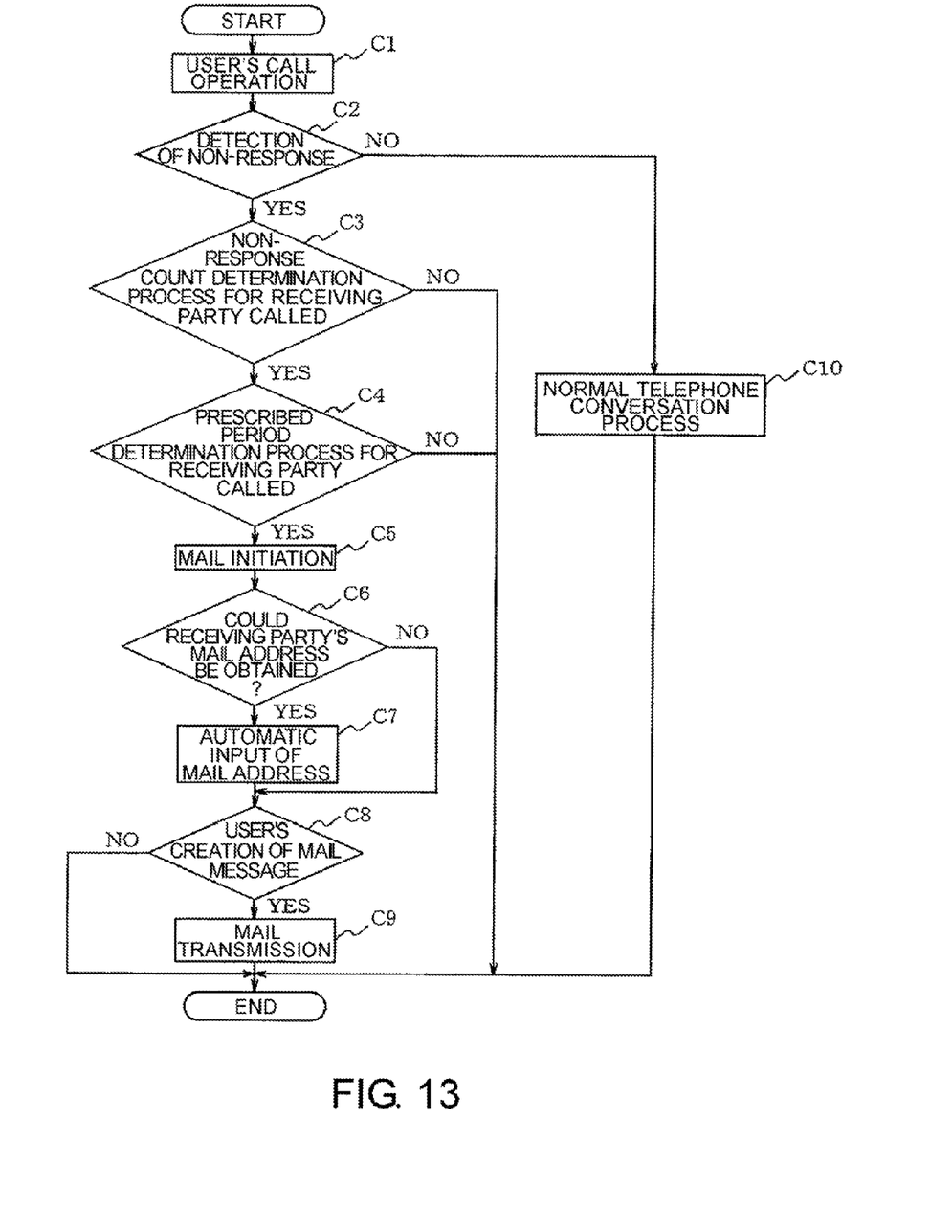
FIG. 13 is a flow chart showing operation of the third embodiment of the present invention.
Figure 14:
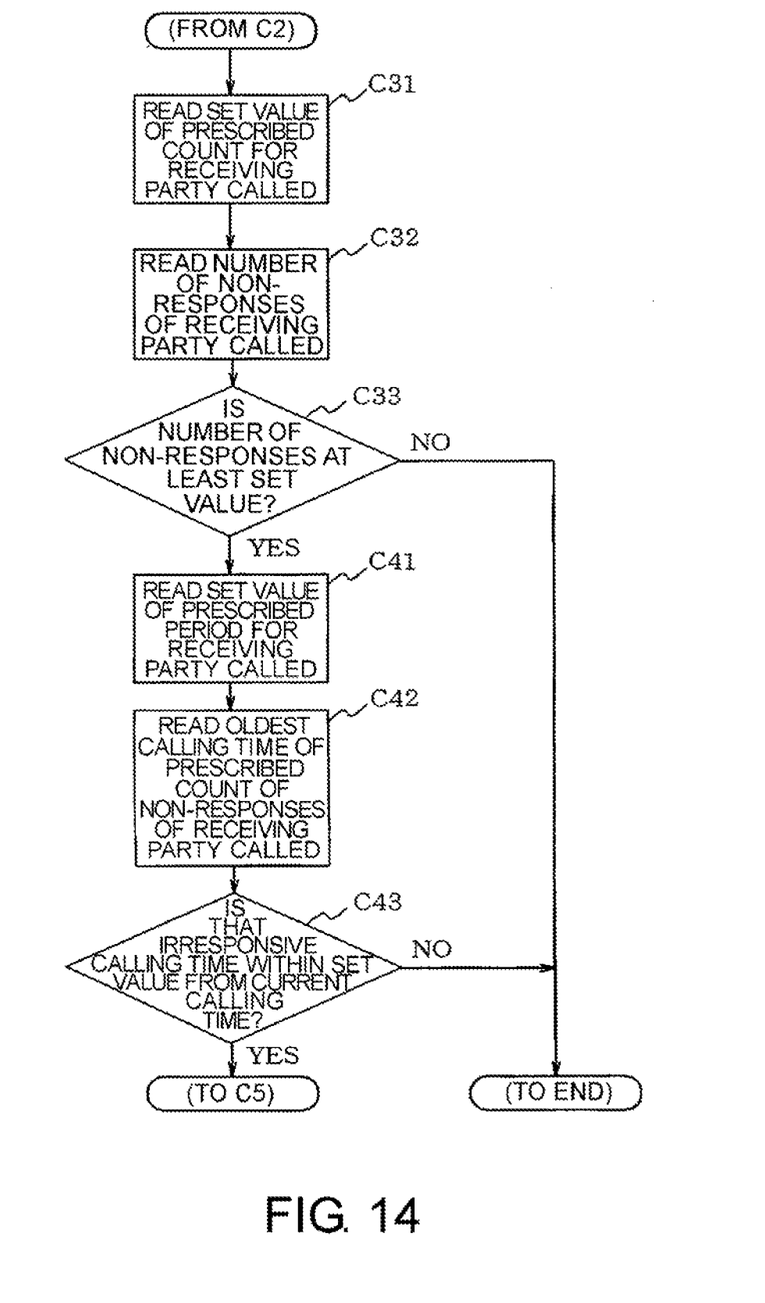
FIG. 14 is a flow chart showing operation of a receiving-party-specific non-response count/non-response period examination process according to the third embodiment of the present invention.

Next, operation of the present embodiment will be described with reference to FIGS. 11 to 14 and 3. FIG. 13 is a flow chart showing operation of the third embodiment of the present invention, and FIG. 14 is a flow chart showing operation of a receiving-party-specific non-response count/non-response period examination process according to the third embodiment of the present invention.

Referring to FIG. 13, because the following steps are the same, their explanations are omitted herein.

Steps C1-C2 and Steps B1-B2 of FIG. 9 (operation of the second embodiment)
Steps C5-C10 and Steps B5-B10 of FIG. 9

Thus, Steps C3-C4 will be described. Since operation of Steps C3 and C4 is illustrated in detail in FIG. 14, it will be described below with reference to FIG. 14.

First, the function switching means 182 acquires a prescribed count (e.g., three times) registered in association with a receiving party who did not respond to the current call with reference to the user-specific prescribed count/prescribed period information 173B (Step C31). Then the function switching means 182 acquires the number of non-responses recorded in association with the telephone number of the receiving party who did not respond to the current call with reference to the outgoing call history information 172. The number of non-responses to be acquired is the number of non-responses in association with the telephone number of the receiving party that have continued in the past until the latest non-response (the current non-response). Assuming that Mr. AA was called at this time and was irresponsive, it can be seen from FIG. 3 that the number of continuous non-responses in association with Mr. AA is three (Nos. 1, 3, and 5) (Step C32). The number of the non-responses is three, and the prescribed count is three. Thus, the number of non-responses is no less than the prescribed count. Therefore, the conditions of the non-response count determination process are met, and the process proceeds to Step C41 (Step C33).

In Step C41, the function switching means 182 acquires a prescribed period of time (e.g., 10 minutes) registered in association with the receiving party who did not respond to the current call with reference to the user-specific prescribed count/prescribed period information 173B (Step C41). Then the function switching means 182 reads the oldest calling time of the prescribed count (three) of the non-responses with reference to the outgoing call history information 172. Referring to FIG. 3, the oldest calling time of the prescribed count of Mr. AA's non-responses was No. 5 (at 12:30 on Jun. 5, 2007) (Step C42). Thereafter, the function switching means 182 examines whether the calling time of No. 5 (at 12:30 on Jun. 5, 2007) is within the prescribed period of time (10 minutes) from the calling time of the current call (No. 1) (at 12:34 on Jun. 5, 2007). If the oldest calling time is within the prescribed period of time, then the process proceeds to Step B5 so that a mail function is initiated. In the above example, a difference between the calling times of No. 5 and No. 1 is four minutes. Therefore, it is determined that the oldest calling time is within the prescribed period of time (Step C43).

As described above, in the present embodiment, since the number of non-responses and a prescribed count are set for each user (receiving party to be called), this configuration is further advantageous in that conditions for mail initiation can be specified in more detail and in consideration of receiving parties to be called as compared to the second embodiment.

Next, a fourth embodiment of the present invention will be described.

Figure 15:
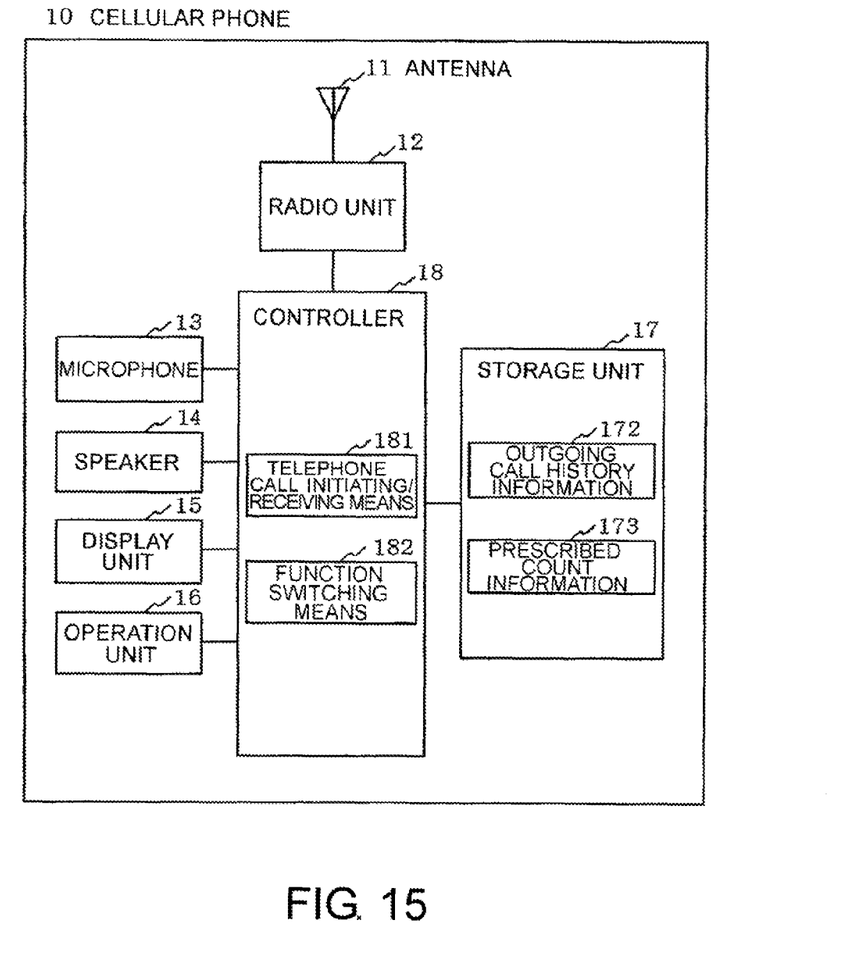
FIG. 15 is a diagram showing a configuration of a fourth embodiment of the present invention.

The present embodiment is arranged by limiting the functions of the first embodiment. As shown in FIG. 15, which is a diagram showing a configuration of the fourth embodiment of the present invention, the configuration of the present embodiment differs from the configuration of the aforementioned first embodiment (FIG. 1) in that the mail transmitting/receiving means 183, the address selecting means 184, and the address book 171 are deleted from the configuration of the first embodiment. Furthermore, operation of the present embodiment is equivalent to the operation of the aforementioned first embodiment (FIG. 5) from which Steps A5-A8 removed.

Thus, the present embodiment has been described in connection with the first embodiment. However, the present embodiment may be arranged by limiting the functions of the second or third embodiment. In this case, the mail transmitting/receiving means 183, the address selecting means 184, and the address book 171 are removed from the configuration of the second embodiment (FIG. 7), and Steps B6-B9 are removed from the operation of the second embodiment (FIG. 9). Alternatively, the mail transmitting/receiving means 183, the address selecting means 184, and the address book 171 are removed from the configuration of the third embodiment (FIG. 11), and Steps C6-C9 are removed from the operation of the third embodiment (FIG. 13).

Next, applications, variations, and the like of the present invention will be described.

In the aforementioned first to fourth embodiments, the present invention is applied to the cellular phone 10. Nevertheless, the present invention is not limited to the cellular phone 10 and is applicable to any telephone device with a mail function.

In the aforementioned first to fourth embodiments, when it is determined whether the number of non-responses is no less than the prescribed count, calls to be counted may be limited to calls made on the same day as the current call or to calls made within specific days before the current call.

In the aforementioned first to fourth embodiments, the set values of the prescribed count and the prescribed period of time are described by way of example. As a matter of course, other values may be used for those set values.

In the aforementioned first to third embodiments, the user inputs contents or the like on a mail creation screen displayed on the display unit 15 with the operation unit 16. Nevertheless, the mail transmitting/receiving means 183 may automatically input a message pre-registered by the user.

In the aforementioned third or fourth embodiment, the prescribed count and the prescribed period of time are set for each individual user in the address book 171. Nevertheless, only one of the prescribed count and the prescribed period of time may be set.

In the aforementioned third or fourth embodiment, the prescribed count and the prescribed period of time of the second embodiment are set for each individual user in the address book 171. Nevertheless, the prescribed count of the first embodiment may be set for each individual user in the address book 171.

In the user-specific prescribed count/prescribed period information 173B of the aforementioned third or fourth embodiment, set values of a prescribed count and a prescribed period of time corresponding to unspecified parties (who have not been associated in the address book 171) may be registered in addition to the set values of the prescribed count and the prescribed period of time for each receiving party, and those set values may be mixed in use.

This application is the National Phase of PCT/JP2008/062973, filed Jul. 11, 2008, which claims priority of Japanese patent application No. 2007-191977, filed on Jul. 24, 2007, the disclosure of which is herein incorporated in its entirety by reference.

The invention claimed is:

1. A telephone device with a mail function, comprising:
    a storage unit in which a prescribed count is pre-registered;
    a telephone call initiating/receiving means for initiating a call to a telephone number of a receiving party, determining whether the receiving party responds to the call, and registering outgoing call history information in the storage unit each time a call is initiated; and
    a function switching means for acquiring the number of continuous non-responses of the same receiving party with reference to the outgoing call history information when the receiving party does not respond and initiating the mail function when the acquired number of the non-responses is no less than the prescribed count.

2. The telephone device with a mail function claimed in claim 1, wherein the prescribed count is registered for each receiving party to be called, and the function switching means examines whether the number of the non-responses is no less than the prescribed count registered in association with the receiving party called.

3. The telephone device with a mail function claimed in claim 1, wherein a prescribed period of time is further pre-registered in the storage unit, and
    the function switching means acquires the number of continuous non-responses of the same receiving party with reference to the outgoing call history information when the receiving party does not respond, calculates a time difference between the oldest calling time of the prescribed count of non-responses and the current calling time if the acquired number of the non-responses is no less than the prescribed count, and initiates a mail function if the time difference is no more than the prescribed period of time.

4. The telephone device with a mail function claimed in claim 3, wherein the prescribed count or the prescribed period of time is registered for each receiving party to be called, and the function switching means examines whether the number of the non-responses is no less than the prescribed count registered in association with the receiving party called or whether the time difference is no more than the prescribed period of time registered in association with the receiving party called.

5. The telephone device with a mail function claimed in claim 1, wherein the storage unit further includes an address book, and the telephone device further comprises:
    an address selecting means for acquiring a mail address from the address book based on a telephone number of the receiving party when the mail function is initiated by the function switching means and for requesting the inputting of the acquired mail address as destination address information to mail transmitting/receiving means; and
    a mail transmitting/receiving means for inputting the mail address received from the address selecting means as destination address information, for creating a mail message and for controlling transmission and reception of a mail message.

6. The telephone device with a mail function claimed in claim 5, wherein the address selecting means notifies the mail transmitting/receiving means of a mail address acquisition failure when a mail address cannot be obtained from the address book, and the mail transmitting/receiving means displays a message requesting a caller to input a mail address.

7. A non-transitory storage medium storing a program executable by a computer for performing:
    a function of registering outgoing call history information each time a call is initiated;
    a function of initiating a call to a telephone number of a receiving party and determining whether the receiving party responds to the call;
    a function of acquiring the number of continuous non-responses of the same receiving party with reference to the outgoing call history information when the receiving party does not respond; and
    a mail initiation function of initiating mail when the acquired number of the non-responses is no less than a prescribed count.

8. The non-transitory storage medium claimed in claim 7, wherein the mail initiation function comprises:
    a function of calculating a time difference between the oldest calling time of the prescribed count of non-responses and the current calling time if the acquired number of non-responses is no less than the prescribed count; and
    a function of initiating mail if the time difference is no more than the prescribed period of time.

9. A mail initiation method, performed by a processor, comprising:
    a step of registering outgoing call history information each time a call is initiated;
    a step of acquiring the number of continuous non-responses of the same receiving party based on the outgoing call history information when the receiving party does not respond to a telephone call; and a mail initiation step of initiating mail when the acquired number of non-responses is no less than a prescribed count.

10. The mail initiation method claimed in claim 9, wherein the mail initiation step includes:
a step of calculating a time difference between the oldest calling time of the prescribed count of non-responses and the current calling time if the acquired number of non-responses is no less than the prescribed count; and
a step of initiating mail if the time difference is no more than the prescribed period of time.

* * * * *